United States Patent
Mitsch et al.

(10) Patent No.: US 6,840,510 B2
(45) Date of Patent: Jan. 11, 2005

(54) LOCOMOTIVE BRAKE VALVE EQUIPPED WITH A RANGE SPRING DAMPENER

(75) Inventors: Matthew D. Mitsch, Pittsburgh, PA (US); James M. Varney, North Huntingdon, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 150 days.

(21) Appl. No.: 09/915,960

(22) Filed: Jul. 26, 2001

(65) Prior Publication Data

US 2003/0020217 A1 Jan. 30, 2003

(51) Int. Cl.[7] ............................................. B60G 11/52
(52) U.S. Cl. ............................................. 267/33; 267/287
(58) Field of Search ........................... 267/169, 170, 267/166, 33, 287, 249

(56) References Cited

U.S. PATENT DOCUMENTS

| | | | | |
|---|---|---|---|---|
| 2,657,070 A | * | 10/1953 | Kaziner | 267/249 |
| 4,732,372 A | * | 3/1988 | Dickhart, III et al. | 267/287 |
| 4,779,850 A | * | 10/1988 | Paton et al. | 267/33 |
| 4,779,854 A | * | 10/1988 | Idigkeit et al. | 267/287 |
| 4,817,921 A | * | 4/1989 | Stevenson | 267/33 |
| 5,211,451 A | * | 5/1993 | Matthews et al. | 303/51 |

* cited by examiner

*Primary Examiner*—Matthew C. Graham
(74) *Attorney, Agent, or Firm*—James Ray & Associates

(57) ABSTRACT

In combination with a railway locomotive brake valve which has an exhaust valve assembly, a spring housing and a range spring, there is a device for providing enhanced damping capabilities. The device minimizes spring oscillation during operation of the locomotive brake valve.

20 Claims, 5 Drawing Sheets

LOCOMOTIVE BRAKE VALVE EQUIPPED WITH A RANGE SPRING DAMPENER

CROSS-REFERENCE TO RELATED APPLICATION

The invention taught in the present application is closely related to the invention taught in co-pending patent applications titled "Spring With Enhanced Damping Capabilities", filed on Aug. 11, 2000 and having Ser. No. 09/636,356, and "Locomotive Brake Valve", filed on Aug. 11, 2000 and having Ser. No. 09/637,716. These applications are assigned to the assignee of the present application. The teachings of these co-pending patent applications are incorporated herein by reference thereto.

FIELD OF INVENTION

The present invention relates, in general, to a locomotive brake valve and, more particularly, this invention relates to a device that will minimize spring oscillation during operation of a locomotive brake valve.

BACKGROUND OF THE INVENTION

Prior to the present invention, a locomotive brake valve is equipped with at least one spring that provides a mechanical force against a diaphragm in order to generate air pressure in the valve. Spring vibration occurs as a result of either the spring operating at its natural frequency, or vibration that is introduced to the spring through its environment during normal operation of the brake valve. If this vibration is not controlled, the brake valve assembly components may be damaged, or experience premature wear.

SUMMARY OF THE INVENTION

In a first aspect, the present invention provides for a railway locomotive brake valve having at least one exhaust valve assembly, at least one spring housing, and at least one range spring. The improvement comprises a device for providing enhanced damping capabilities, whereby the device will minimize spring oscillation during operation of the locomotive brake valve.

In a further aspect, the present invention provides for a railway locomotive brake valve having at least one exhaust valve assembly, at least one spring housing, and at least one range spring with enhanced damping capabilities. The improvement comprises a device for providing additional damping capabilities, whereby the device will minimize spring oscillation during operation of the locomotive brake valve.

In still a further aspect, the present invention provides a device for dampening spring oscillation in a railway locomotive brake valve. The device comprises a first element having a predetermined size, shape, and material. A plurality of members having a predetermined size, shape, and material are attached in a predetermined position to the first element for engaging with a spring to minimize spring oscillation when the device is disposed about a spring.

OBJECTS OF THE INVENTION

It is therefore a primary object of the present invention to provide a spring in a locomotive brake valve with enhanced damping capabilities.

Another object of the present invention is to provide a spring in a locomotive brake valve with enhanced damping capabilities to minimize spring oscillation.

Still another object of the present invention is to provide a locomotive brake valve spring with enhanced damping capabilities to minimize and prevent brake valve component damage.

In addition to the various objects of the invention that have been described above, various other objects and advantages will become more readily apparent to those persons skilled in the relevant art from the following more detailed description of the invention, particularly, when such description is taken in conjunction with the attached figures and the appended claims.

Figure 1:
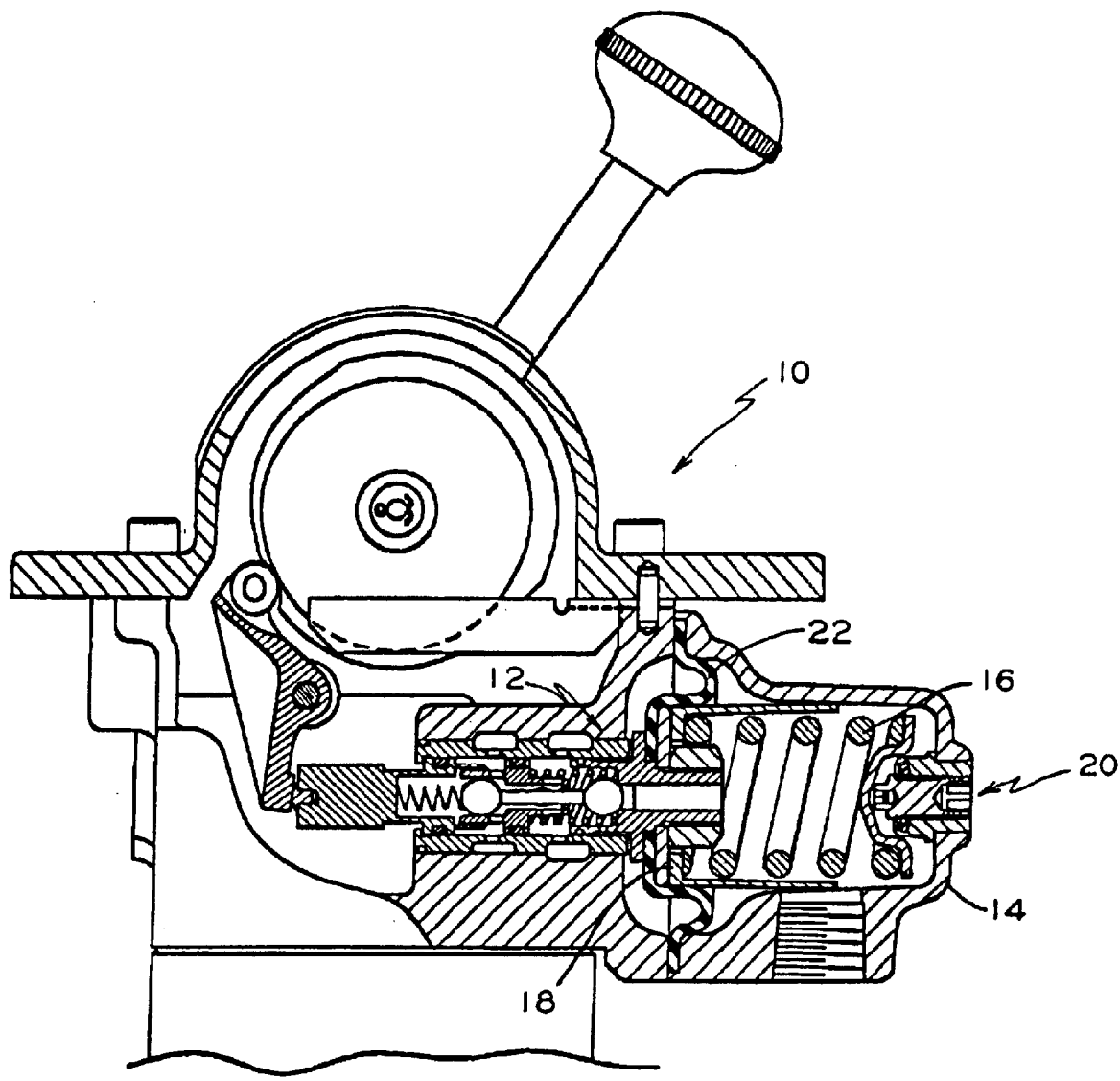
FIG. 1 is a vertical sectional view of a presently preferred embodiment of a locomotive brake valve assembly comprising a device for providing enhanced damping capabilities.

BRIEF DESCRIPTION OF A PRESENTLY PREFERRED AND VARIOUS ALTERNATIVE EMBODIMENTS OF THE PRESENT INVENTION

Prior to proceeding to a more detailed description of the invention, it should be noted that identical components having identical functions have been designated with identical reference numerals for the sake of clarity.

Figure 2:
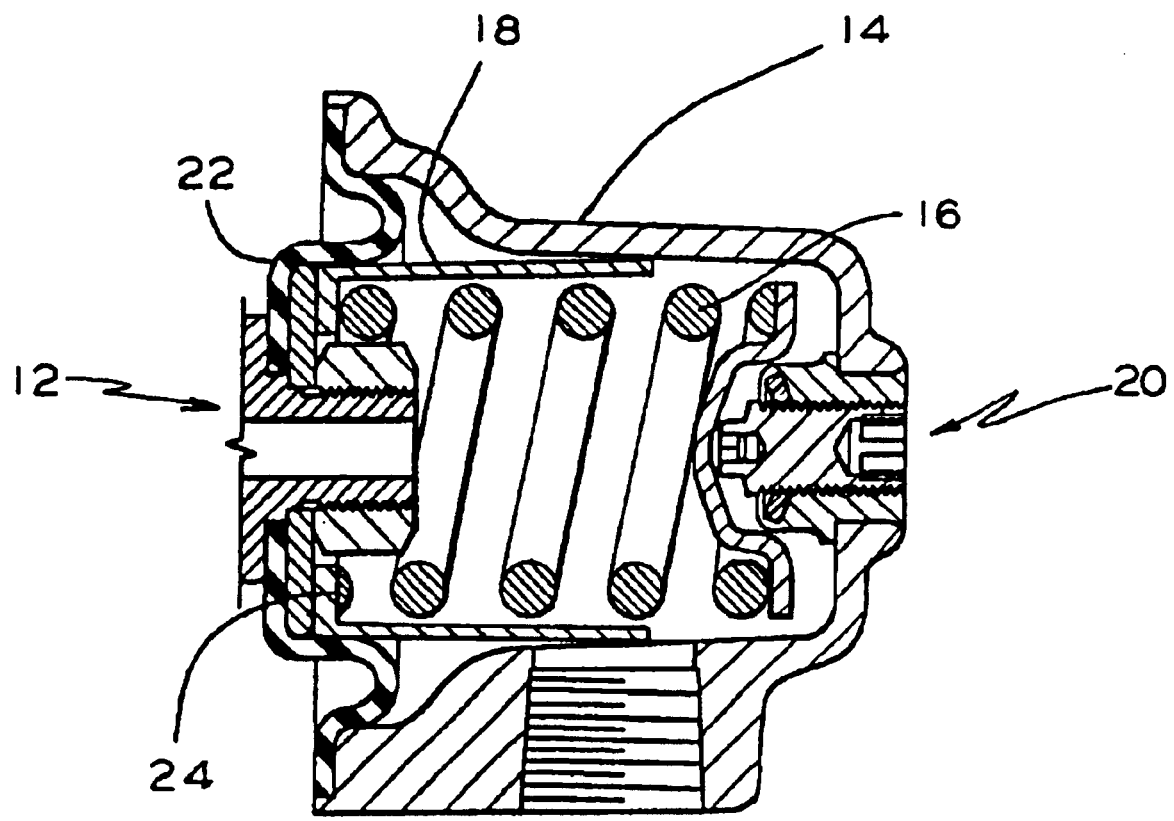
FIG. 2 is an enlarged sectional view taken from FIG. 1, which shows the portion of the locomotive brake valve assembly comprising a device for providing enhanced damping capabilities.

Now refer more particularly to FIGS. 1 and 2 of the drawings. Illustrated therein is a locomotive brake valve, generally designated 10, having at least one exhaust valve assembly, generally designated 12, a spring housing 14, and a range spring 16. The improvement comprises a device 18 for providing damping capabilities. Preferably, the device 18 is a spring dampener of a predetermined size, shape, and material, engageable with the exhaust valve assembly 12, the spring housing 14, and the range spring 16. Preferably, the material of the spring dampener is at least one of plastic and metal. Preferably, the material is metal, and the metal is steel. It is also preferred that the range spring 16 is disposed intermediate the pressure regulating means, generally designated 20, and the diaphgram 22. Preferably, the device 18 is located on a first end 24 of the range spring 16 adjacent the diaphragm 22. The device 18 will minimize spring oscillation during operation of the locomotive brake valve 10. In a 30-style locomotive brake valve, an automatic and independent braking function is integrated into the same valve assembly 10. Therefore, two range springs 16 are present. FIGS. 1 and 2 illustrate the use of the device 18 in the independent portion of the locomotive brake valve 10. If range spring oscillation occurs in the automatic portion (not shown), the device 10 can also be used in the automatic portion in a similar manner.

Figure 3:
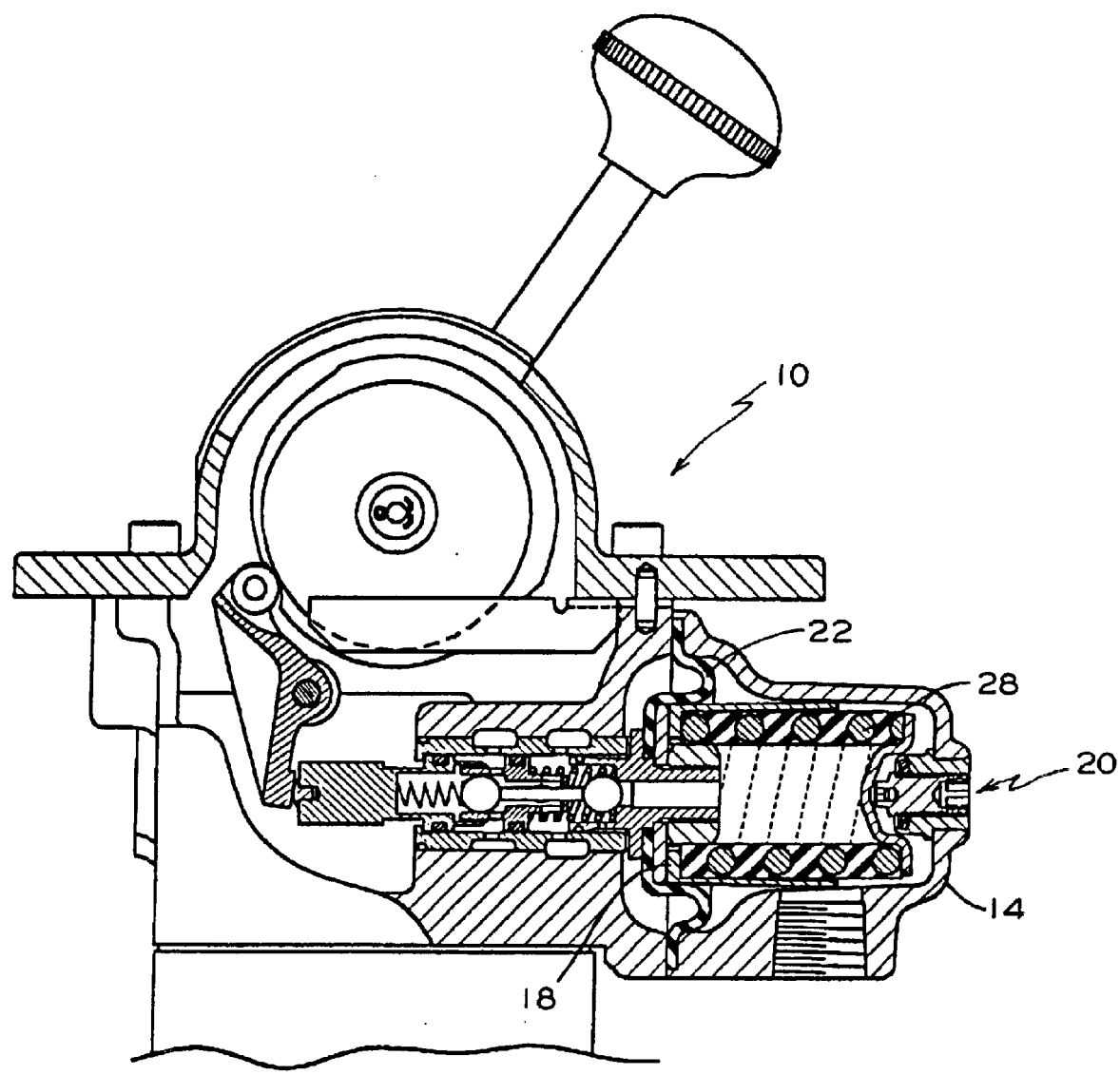
FIG. 3 is a vertical sectional view of an alternative embodiment of a locomotive brake valve assembly comprising a device for providing enhanced damping capabilities.
Figure 4:
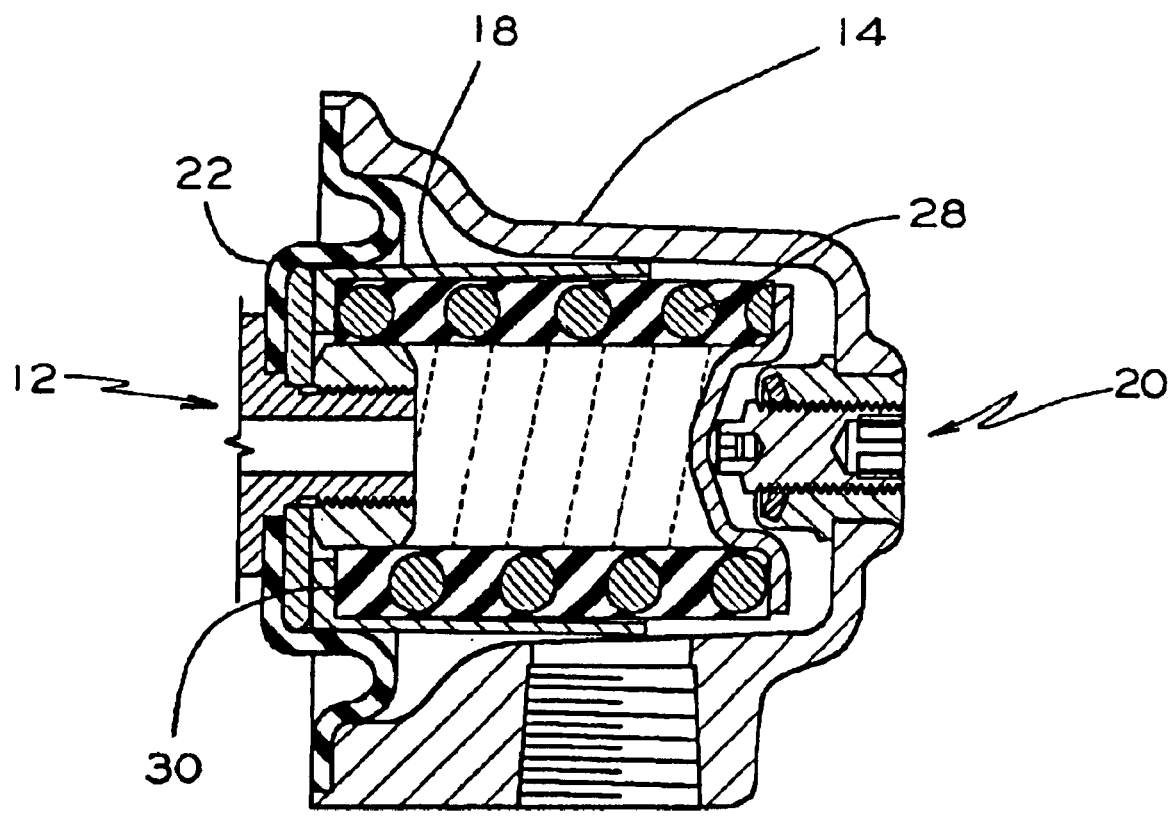
FIG. 4 is an enlarged sectional view taken from FIG. 3 of the alternative embodiment of the invention.

Now refer more particularly to FIGS. 3 and 4 of the drawings. Illustrated therein is a locomotive brake valve, generally designated 10, having at least one exhaust valve assembly, generally designated 12, a spring housing 14, and a range spring with enhanced damping capabilities 28. The improvement comprises a device 18 for providing additional damping capabilities. Preferably, the device 18 is a spring dampener of a predetermined size, shape, and material, engageable with the exhaust valve assembly 12, the spring housing 14, and the range spring with enhanced damping capabilities 28. Preferably, the material of the spring dampener is at least one of plastic and metal. Preferably, the material is metal, and the metal is steel. It is also preferred that the range spring with enhanced damping capabilities 28 is disposed intermediate a pressure regulating means, generally designated 20, and a diaphragm 22. Preferably, the device 18 is located on a first end 30 of the range spring with enhanced damping capabilities 28, adjacent to the diaphragm 22. The device 18 will minimize spring oscillation during operation of the locomotive brake valve 10. FIGS. 3 and 4 illustrate the use of the device 18 in the independent portion of the locomotive brake valve 10. If range spring oscillation occurs in the automatic portion (not shown), the device 10 can also be used in the automatic portion in a similar manner.

Figure 5:
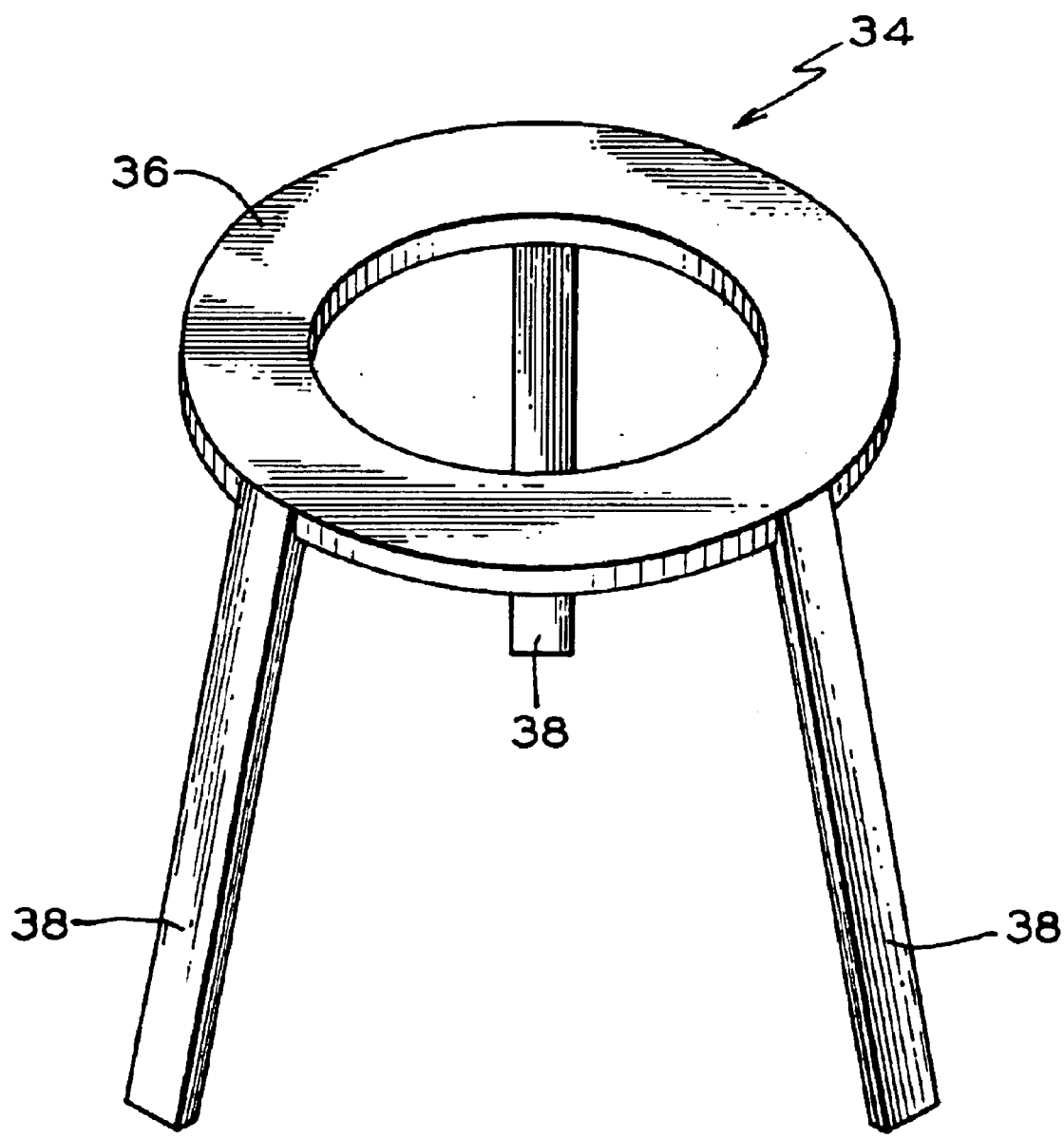
FIG. 5 is a perspective view of a device for providing enhanced damping capabilities for a spring in a locomotive brake valve assembly.

Now refer more particularly to FIG. 5 of the drawings. Illustrated therein is a device, generally designated 34, which is comparable to device 18 in FIGS. 1–4, for providing damping capabilities for a range spring (not shown) in a locomotive brake valve (not shown). The device 34 comprises a donut shaped element 36 having a predetermined size, shape, and material. Such donut shaped element 36 has an opening to permit engagement with such exhaust valve assembly 12. as seen in FIGS. 1–4. The device 34 also comprises a plurality of legs 38 having a predetermined size, shape, and material. The legs 38 are attached in a predetermined position to the donut shaped element 36 for engaging with a range spring (not shown) to minimize spring oscillation when the device 34 is disposed about the spring. Preferably, the plurality of the legs 38 is three, and the legs 38 are integrally attached at a predetermined angle to the donut shaped element 36. The angle of the legs 38 is determined by the amount of range spring dampening required. As is clearly seen in FIG. 5 the angle of attachment may vary somewhat because of the amount of dampening needed but the angle will always be greater than 90°, so that the legs 38 engage the inner surface of spring housing 14. Preferably, the material of the dampening device is steel.

Although the invention has been shown in connection with a certain specific embodiment, it will be readily apparent to those skilled in the art that various changes in form and arrangement of parts and method may be made to suit requirements without departing from the spirit and scope of the invention.

We claim:

1. In combination with a railway locomotive brake valve having at least one exhaust valve assembly, at least one spring housing, and at least one range spring disposed intermediate a pressure regulating means and a diaphragm, the improvement comprising a device for providing damping capabilities, whereby said device will minimize spring oscillation during operation of said locomotive brake valve, said device including:
   (a) a donut shaped element having a predetermined size and shape and formed from a predetermined material, said donut shaped element having a central opening to permit engagement with said at least one exhaust valve assembly; and
   (b) a plurality of legs having a predetermined size, shape and material attached solely at one end thereof to said donut shaped element adjacent an outer periphery thereof for engagement with said range spring to minimize oscillation when said device is disposed about said range spring, said plurality of legs are attached to said donut shaped element at a predetermined angle, said predetermined angle between said plurality of legs and said donut shaped like element being always greater than 90°.

2. The combination according to claim 1 wherein said device is a spring dampener of a predetermined size, shape, and material engageable with said spring housing, and said range spring.

3. The combination according to claim 2 wherein said material of said spring dampener is at least one of plastic and metal.

4. The combination according to claim 3 wherein said material is metal.

5. The combination according to claim 4 wherein said metal is steel.

6. The combination according to claim 1 wherein said range spring is disposed intermediate a pressure regulating means and a diaphragm.

7. The combination according to claim 1 wherein said device is located on a first end of said range spring adjacent said diaphragm.

8. In combination with a railway locomotive brake valve having at least one exhaust valve assembly, at least one spring housing, and at least one range spring with enhanced damping capabilities, the improvement comprising a device for providing additional damping capabilities, whereby said device will minimize spring oscillation during operation of said locomotive brake valve.

9. The combination according to claim 8 wherein said device is a spring dampener of a predetermined size, shape, and material engageable with said exhaust valve assembly, said spring housing, and said range spring with enhanced damping capabilities.

10. The combination according to claim 9 wherein said material of said spring dampener is at least one of plastic and metal.

11. The combination according to claim 10 wherein said material is metal.

12. The combination according to claim 11 wherein said metal is steel.

13. The combination according to claim 8 wherein said spring is disposed intermediate a pressure regulating means and a diaphragm.

14. The combination according to claim 8 wherein said device is located on a first end of said range spring adjacent a diaphragm.

15. A dampening device for a range spring in a railway locomotive brake valve, said device comprising:
   (a) a donut shaped element having a predetermined size and shape and formed from a predetermined material, said donut shaped element having a central opening; and
   (b) a plurality of legs having a predetermined size, shape and material attached solely at one end thereof to said donut shaped element adjacent an outer periphery thereof for engagement with said range spring to minimize oscillation when said device is disposed about said range spring, said plurality of legs are attached to said donut shaped element at a predetermined angle, said predetermined angle between said plurality of legs and said donut shaped like element being always greater than 90°.

16. The dampening device according to claim 15 wherein said shape of said first element is annular.

17. The dampening device according to claim 15 wherein said plurality of said members is three.

18. The dampening device according to claim 15 wherein said members are integrally attached at a predetermined angle to said first element.

19. The dampening device according to claim 15 wherein said material of said dampening device is metal.

20. The dampening device according to claim 19 wherein said metal is steel.

* * * * *